(12) United States Patent
Yamamoto et al.

(10) Patent No.: US 11,837,236 B2
(45) Date of Patent: *Dec. 5, 2023

(54) SPEAKER RECOGNITION BASED ON SIGNAL SEGMENTS WEIGHTED BY QUALITY

(71) Applicant: NEC Corporation, Tokyo (JP)

(72) Inventors: Hitoshi Yamamoto, Tokyo (JP); Takafumi Koshinaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 34 days.

This patent is subject to a terminal disclaimer.

(21) Appl. No.: 17/545,107

(22) Filed: Dec. 8, 2021

(65) Prior Publication Data

US 2022/0101859 A1 Mar. 31, 2022

Related U.S. Application Data

(63) Continuation of application No. 16/475,743, filed as application No. PCT/JP2017/008979 on Mar. 7, 2017, now Pat. No. 11,250,860.

(51) Int. Cl.
*G10L 17/02* (2013.01)
*G10L 17/04* (2013.01)
*G10L 17/18* (2013.01)
*G10L 25/63* (2013.01)

(52) U.S. Cl.
CPC .............. *G10L 17/02* (2013.01); *G10L 17/04* (2013.01); *G10L 17/18* (2013.01); *G10L 25/63* (2013.01)

(58) Field of Classification Search
None
See application file for complete search history.

(56) References Cited

U.S. PATENT DOCUMENTS

| | | | |
|---|---|---|---|
| 5,522,012 A * | 5/1996 | Mammone | G10L 17/02 704/250 |
| 6,076,057 A | 6/2000 | Narayanan | G10L 15/065 704/233 |
| 11,250,860 B2 * | 2/2022 | Yamamoto | G10L 17/04 |
| 2008/0181417 A1 * | 7/2008 | Pereg | G10L 17/00 704/E11.001 |
| 2012/0303369 A1 | 11/2012 | Brush et al. | |
| 2015/0269940 A1 | 9/2015 | Fujimura | |
| 2016/0098993 A1 | 4/2016 | Yamamoto et al. | |

(Continued)

FOREIGN PATENT DOCUMENTS

| | | |
|---|---|---|
| JP | 2004-341340 A | 12/2004 |
| JP | 2015-184378 A | 10/2015 |

(Continued)

OTHER PUBLICATIONS

Japanese Office Action for JP Application No. 2021-029416 dated Jun. 15, 2022 with English Translation.

(Continued)

*Primary Examiner* — Jesse S Pullias

(57) ABSTRACT

This speech processing device is provided with: a contribution degree estimation means which calculates a contribution degree representing a quality of a segment of the speech signal; and a speaker feature calculation means which calculates a feature from the speech signal, for recognizing attribute information of the speech signal, using the contribution degree as a weight of the segment of the speech signal.

13 Claims, 5 Drawing Sheets

(56) References Cited

U.S. PATENT DOCUMENTS

| | | | |
|---|---|---|---|
| 2016/0217792 A1 | 7/2016 | Gorodetski | G10L 17/04 |
| 2016/0307572 A1* | 10/2016 | Avilés-Casco | G10L 15/01 |
| 2017/0061970 A1* | 3/2017 | Escott | G10L 17/20 |

FOREIGN PATENT DOCUMENTS

| | | | | |
|---|---|---|---|---|
| JP | 2016-075740 A | 5/2016 | | |
| WO | WO-2016209888 A1 | 12/2006 | | G01L 15/22 |
| WO | 2012/020591 A1 | 2/2012 | | |
| WO | WO-2016209888 A1 * | 12/2016 | | G10L 15/02 |

OTHER PUBLICATIONS

Hitoshi Yamamoto et al., "Denoising autoencoder-based speaker feature restoration for utterances of short duration", Interspeech 2015, Sep. 6, 2015, pp. 1052-1056.

Sri Garimella et al., "Robust i-vector based Adaptation of DNN Acoustic Model for Speech Recognition", Interspeech 2015, Sep. 6, 2015, pp. 2877-2881.

Naohiro Tawara et al., "Speaker clustering under noisy conditions using i-vector-based spectral clustering", IPSJ SIG Technical Report, vol. 2015-SLP-105, No. 11, Japan, Feb. 28, 2015, pp. 1-6.

Lenka Mackova et al., "Emotion Recognition in I-vector Space", 2016 26th International Conference Radioelektronika, Apr. 19, 2016.

Japanese Office Action for JP Application No. 2021-029416 dated Dec. 15, 2021 with English Translation.

Dehak et al., "Front-End Factor Analysis for Speaker Verification". IEEE Transactions on Audio Speech. and Language Processing. May 2011, vol. 19, No. 4. pp. 788-798 (total 11 pages).

International Search Report dated May 23, 2017 for PCT/JP2017/008979.

Written Opinion dated May 23, 2017 for PCT/JP2017/008979.

\* cited by examiner

SPEAKER RECOGNITION BASED ON SIGNAL SEGMENTS WEIGHTED BY QUALITY

CROSS-REFERENCE TO RELATED APPLICATIONS

The present application is a continuation application of U.S. patent application Ser. No. 16/475,743 filed on Jul. 3, 2019, which is a National Stage Entry of international application PCT/JP2017/008979, filed on Mar. 7, 2017, the disclosures of all of which are incorporated in their entirety by reference herein.

TECHNICAL FIELD

This invention relates to a speech processing device, a speech processing method, and a speech processing program.

BACKGROUND ART

A speech processing device is known which calculates, on the basis of a speech signal, a speaker feature indicative of individuality for identifying a speaker which utters speech. Also, a speaker recognition device is known which estimates, using the speaker feature, the speaker uttering the speech.

The speaker recognition device using the speech processing device of the type evaluates, in order to identify the speaker, the degree of similarity between a first speaker feature extracted from a first speech signal and a second speaker feature extracted from a second speech signal. Then, the speaker recognition device determines, on the basis of a result of evaluation of the degree of similarity, whether or not the speakers of the two speech signals are identical with each other.

Non-Patent Literature 1 describes a technique for extracting a speaker feature from a speech signal. The speaker feature extraction technique described in Non-Patent Literature 1 calculates a speech statistic of the speech signal using a speech model. Then, the speaker feature extraction technique described in Non-Patent Literature 1 processes the speech statistic based on a factor analysis technique to calculate a speaker feature vector represented by a predetermined number of elements. That is, Non-Patent Literature 1 uses the speaker feature vector as a speaker feature indicative of individuality of the speaker.

CITATION LIST

Non-Patent Literature

NPL 1: Najim Dehak, Patrick Kenny, Reda Dehak, Pierre Dumouchel, and Pierre Ouellet, "Front-End Factor Analysis for Speaker Verification," IEEE Transaction on Audio, Speech and Language Processing, Vol. 19, No. 4, pp. 788-798, 2011

SUMMARY OF INVENTION

Technical Problem

However, the technique described in Non-Patent Literature 1 has a problem that an accuracy in speaker recognition using the extracted speaker feature is not sufficient.

The technique described in Non-Patent Literature 1 carries out predetermined statistical processing on the speech signal supplied to a speaker feature extraction device. Specifically, the technique described in Non-Patent Literature 1 calculates the speaker feature vector by carrying out uniform statistical processing on a whole of the speech signal supplied to the speaker feature extraction device. For that reason, in the technique described in Non-Patent Literature 1, the speaker feature vector is calculated from the whole of the speech signal even if a signal unsuitable as a base for calculating the individuality of the speaker is included in a segment of the speech signal. This results in a risk of detracting the accuracy in the speaker recognition. Specifically, in a case where, for example, indistinct utterance of the speaker, any sound different from a speaking voice, such as coughing or laughing of the speaker, noises, and so on are mixed in the segment of the speech signal, there is a risk of detracting the accuracy in the speaker recognition.

This invention has been made in view of the above-mentioned problem, and it is an object of this invention to provide a speech processing device, a speech processing method, and a speech processing program which are capable of further improving an accuracy of speaker recognition.

Solution to Problem

A speech processing device according to a first aspect of the present invention comprises a contribution degree estimation unit configured to calculate a contribution degree representing a quality of a segment of the speech signal; and a speaker feature calculation unit configured to calculate a feature from the speech signal, for recognizing attribute information of the speech signal, using the contribution degree as a weight the segment of the speech signal.

A speech processing method according to a second aspect of the present invention comprises calculating a contribution degree representing a quality of a segment of the speech signal; and calculating a feature from the speech signal, for recognizing attribute information of the speech signal, using the contribution degree as a weight of the segment of the speech signal.

A speech processing program according to a third aspect of the present invention causes a computer to execute a process for calculating a contribution degree representing a quality of a segment of the speech signal; and a process for calculating a feature from the speech signal, for recognizing attribute information of the speech signal, using the contribution degree as a weight of the segment of the speech signal.

Advantageous Effect of Invention

According to this invention, it is possible to provide a speech processing device, a speech processing method, and a speech processing program which are capable of further improving an accuracy of speaker recognition.

DESCRIPTION OF EMBODIMENTS

Now, example embodiments of a speech processing device and a speaker feature extraction device will be described in detail with reference to the drawings. Herein, components depicted by the same reference symbols in the example embodiments carry out the similar operations and, therefore, description thereof may be omitted.

First Example Embodiment

Figure 1:
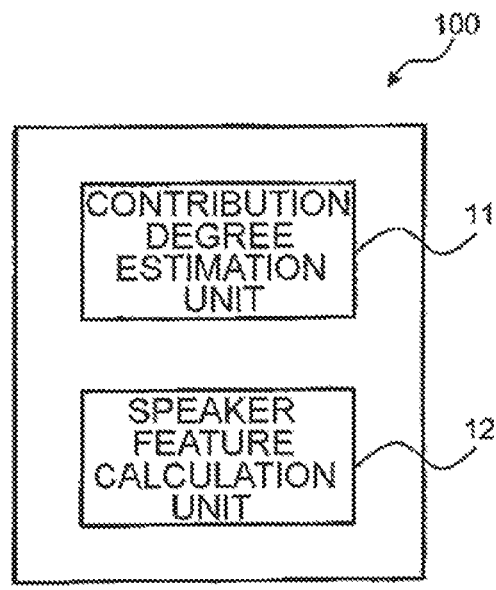
FIG. 1 is a block diagram for illustrating a configuration of a speech processing device according to a first example embodiment of the present invention.

FIG. 1 is a block diagram for illustrating a configuration of a speech processing device according to a first example embodiment of the present invention.

The speech processing device 100 includes a contribution degree estimation unit 11 and a speaker feature calculation unit 12.

The contribution degree estimation unit 11 receives a speech signal indicative of speech from an outside. The contribution degree estimation unit 11 calculates, on the basis of the received speech signal, a contribution degree which is a numerical value representing a quality of a segment of the speech signal.

The speaker feature calculation unit 12 calculates a feature from the speech signal, for recognizing attribute information of the speech signal, using the contribution degree calculated by the contribution degree estimation unit 11 as a weight of the segment of the speech signal.

Herein, the attribute information of the speech signal includes information indicative of a speaker of the speech signal, a language spoken in the speech signal, an emotion included in the speech signal, a type of personality of the speaker of the speech signal, or the like.

Figure 2:
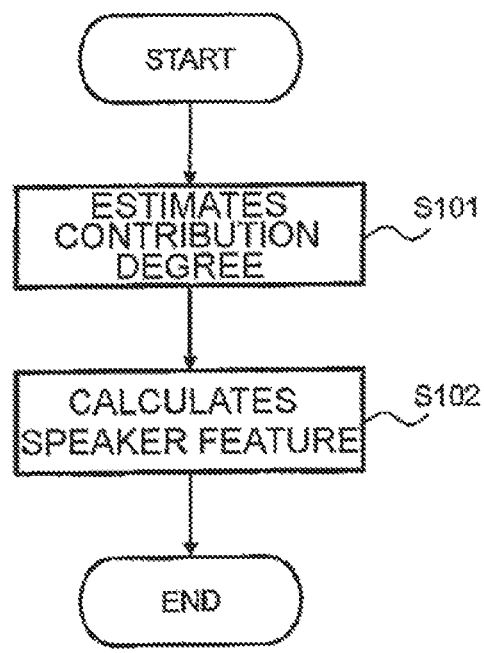
FIG. 2 is a flow chart for illustrating a flow of an operation of the speech processing device according to the first example embodiment of the present invention.

Referring to FIG. 2, description will proceed to a flow of an operation of the speech processing device 100. FIG. 2 is a flow chart for illustrating the flow of the operation of the speech processing device according to the first example embodiment of the present invention First, the contribution degree estimation unit 11 calculates, on the basis of the speech signal received from the outside, the contribution degree of the segment of the speech signal (step S101). Subsequently, the contribution degree estimation unit 11 sends the calculated contribution degree of the segment of the speech signal to the speaker feature calculation unit 12.

Next, the speaker feature calculation unit 12 calculates the feature based on the contribution degree received from the contribution degree estimation unit 11 (step S102).

Second Example Embodiment

Figure 3:
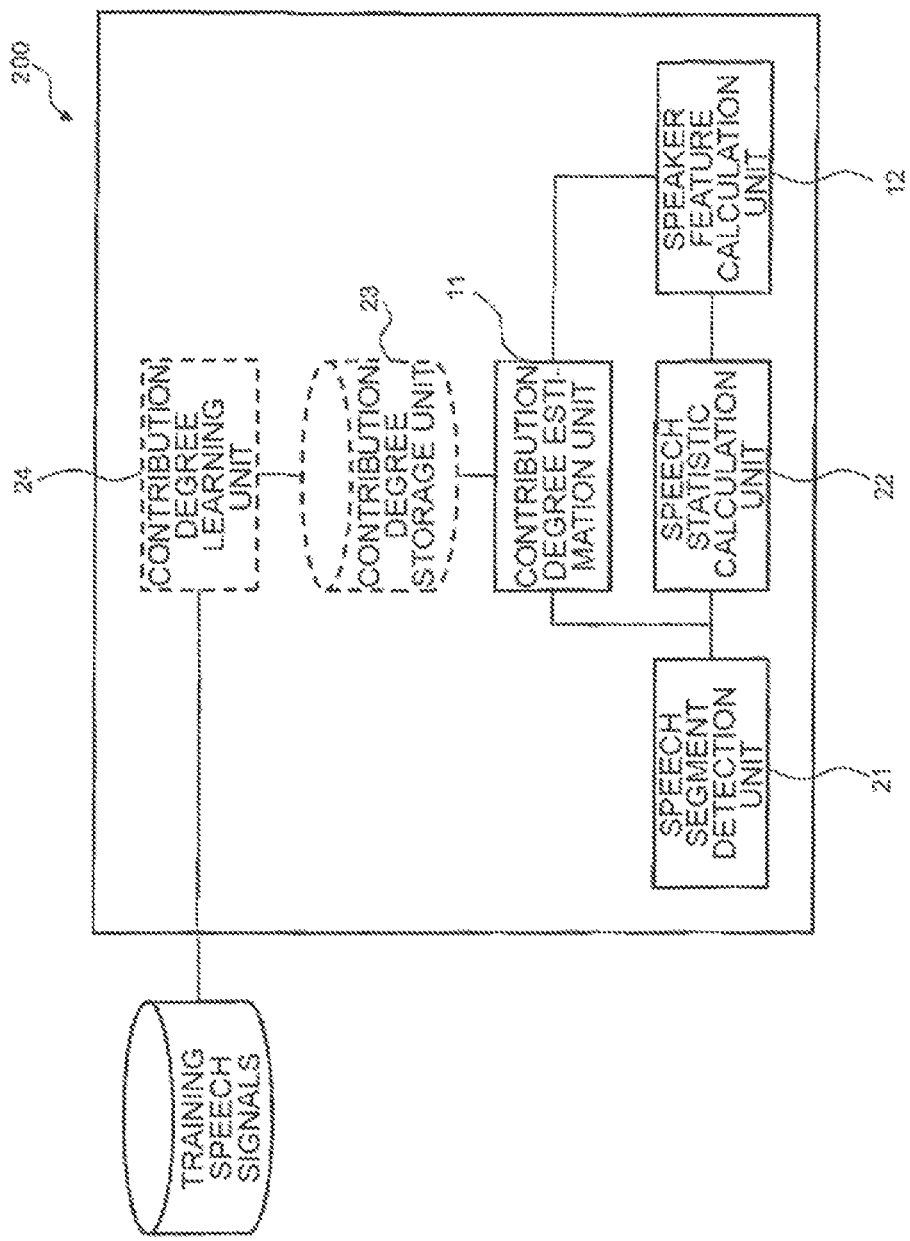
FIG. 3 is a block diagram for illustrating a configuration of a speech processing device according to a second example embodiment of the present invention.

FIG. 3 is a block diagram for illustrating a configuration of a speech processing device 200 according to a second example embodiment. The speech processing device 200 includes the contribution degree estimation unit 11, the speaker feature calculation unit 12, a speech segment detection unit 21, and a speech statistic calculation unit 22. The speech processing device 200 may further include a contribution degree storage unit 23 and a contribution degree learning unit 24.

The speech segment detection unit 21 receives the speech signal from the outside. The speech segment detection unit 21 detects speech segments included in the received speech signal to segment the speech signal. In this event, the speech segment detection unit 21 may segment the speech signal into constant lengths or into different lengths. For example, the speech segment detection unit 21 may segment the speech signal by determining, as silence, a segment in which a sound volume of the speech signal is continuously less than a predetermined value during a given time period, and, as different speech segments, those segments before and after that segment. Then, the speech segment detection unit 21 outputs a segmented speech signal as a result of segmentation (processed result of the speech segment detection unit 21) to the contribution degree estimation unit 11 and the speech statistic calculation unit 22. Herein, receiving the speech signal means, for example, reception of the speech signal from an external device or another processing device, or delivery of a processed result of speech signal processing from another program. In addition, outputting means, for example, transmission to the external device or another processing device, or delivery of the processed result of the speech segment detection unit 21 to another program.

The speech statistic calculation unit 22 receives the segmented speech signal from the speech segment detection unit 21. The speech statistic calculation unit 22 calculates, on the basis of the received segmented speech signal, a speech statistic representing a degree of appearance of each of types of sounds included in the segmented speech signal. Herein, the types of the sounds mean, for example, phonemes or words which are defined by a language, or a group of sounds obtained by clustering the speech signal using the degree of similarity. Then, the speech statistic calculation unit 22 delivers the speech statistic to the speaker feature calculation unit 12. Hereinafter, the speech statistic calculated on any speech signal is called a speech statistic of the speech signal.

Description will proceed to an example of a method according to which the speech statistic calculation unit 22 calculates the speech statistic. Specifically, the speech statistic calculation unit 22 calculates, on the basis of the segmented speech signal received from the speech segment detection unit 21, sound features represented by a calculated result obtained by carrying out frequency analysis processing on the segmented speech signal to produce the calculated result. For instance, the speech statistic calculation unit 22 converts the segmented speech signal received from the speech segment detection unit 21 into a time series of short-time frames. Then, the speech statistic calculation unit 22 frequency-analyzes respective frames in the time series of short-time frames to produce a processed result as the sound features. In this event, the speech statistic calculation unit 22 generates, as the time series of short-time frames, for example, a frame having an interval of 25 milliseconds every 10 milliseconds. The speech statistic calculation unit 22 calculates, as the sound features as the frequency analyzed result, for example, a frequency filter bank feature obtained by Fast Fourier Transform (FFT) and filter bank processing, a Mel-Frequency Cepstrum Coefficients (MFCC) feature obtained by further carrying out discrete cosine transform processing in addition, or the like.

Then, the speech statistic calculation unit 22 calculates, using a time series of the sound features and a speech model storing a correspondence relationship between the sound features and the types of the sounds, a time series of numerical information indicative of the types of the sounds. For example, in a case where the speech model is a Gaussian Mixture Model (GMM), the speech statistic calculation unit 22 calculates, on the basis of a mean, a variance, and a mixture coefficient in each element distribution of the Gaussian Mixture Model, a posterior probability of each element distribution. Herein, the posterior probability of each element distribution is a frequency of occurrence of each of the types of the sounds included in the speech signal. For example, in a case where the speech model is a Neural Network, the speech statistic calculation unit 22 calculates, on the basis of the sound features and weighting factors of the Neural Network, the frequency of occurrence of the type of the sounds included in the speech signal.

The contribution degree storage unit 23 stores one or more contribution degree estimators. The contribution degree estimator is configured to operate so as to assort the speech signal into a plurality of kinds according to the quality of the signal. The contribution degree estimator produces, for example, numerical information indicative of the quality of the speech signal. The kinds of the quality of the signal are, for example, a speech sound, a non-speech sound, and silence. In addition, the kinds of the quality of the signal are, for example, a speech sound leading to a correct solution in the speaker recognition and a speech sound causing an error in the speaker recognition.

Specifically, the contribution degree storage unit 23 stores parameters held by the contribution degree estimators. For example, in a case where the contribution degree estimator is a neural network, the contribution degree storage unit 23 stores, as the parameters, a set of the number of nodes constituting it, connection weighting factors between the nodes, and so on.

Although, in FIG. 3, description has been made as regards an example where the contribution degree storage unit 23 is incorporated into the speech processing device 200, this invention is not limited thereto. The contribution degree storage unit 23 may be implemented by a storage unit which is provided outside the speech processing device 200.

The contribution degree estimation unit 11 receives the segmented speech signal from the speech segment detection unit 21. The contribution degree estimation unit 11 calculates numerical information representing the quality of the segmented speech signal using the contribution degree estimators stored in the contribution degree storage unit 23. In the manner similar to the speech statistic calculation unit 22, the contribution degree estimation unit 11 converts the segmented speech signal into a time series of short-time frames, calculates sound features of the respective frames, and calculates a time series of the sound features. Subsequently, the contribution degree estimation unit 11 calculates a numerical value representing the quality of each frame by using the sound feature of each frame and the parameters of the contribution degree estimators. Hereinafter, the numerical value representing the quality of the signal calculated on any speech signal is called a contribution degree of the speech signal.

Specifically, in a case where the contribution degree estimator is, for example, the neural network, the contribution degree estimation unit 11 calculates, on the basis of the sound features and the weighting factors of the neural network, the contribution degree of the sound features. For instance, it is assumed that the contribution degree estimator is the neural network and that an output layer thereof corresponds to the two kinds of the quality of signals, namely, "a signal leading to a correct solution in the speaker recognition" and "a signal causing an error in the speaker recognition". In this event, the contribution degree estimator calculates a probability that the sound feature is a signal leading to a correct solution in the speaker recognition and a probability that the sound feature is a signal causing an error in the speaker recognition, and produces, as the contribution degree, for example, the probability of being "the signal leading to a correct solution in the speaker recognition". In addition, before execution of the speaker recognition, the contribution degree estimation unit 11 may identify whether or not a segment of the speech signal is the speech to calculate a probability of being the speech.

The speaker feature calculation unit 12 receives the speech statistic produced by the speech statistic calculation unit 22 and the contribution degree produced by the contribution degree estimation unit 11. The speaker feature calculation unit 12 calculates, using the speech statistic and the contribution degree, a feature for recognizing attribute information from the speech signal.

Description will proceed to an example of a method according to which the speaker feature calculation unit 12 calculates, as the feature of a speech signal x, a feature vector F(x) based on an i-vector. The feature vector F(x) calculated by the speaker feature calculation unit 12 may any vector which can be calculated by carrying out a predetermined operation on the speech signal x, and the i-vector is an example thereof.

The speaker feature calculation unit 12 receives, from the speech statistic calculation unit 22, as information of the statistic of the speech signal x, for example, a sound posterior probability Pt(x) and the sound feature At(x) (t={1 ... T}, where T represents a natural number which is not less than 1) which are calculated every short-time frame. Further, the speaker feature calculation unit 12 receives, from the contribution degree estimation unit 11, as information of the contribution degree of the speech signal x, for example, the contribution degree Ct(x) calculated every short-time frame. The speaker feature calculation unit 12 multiplies each element of the sound posterior probability Pt(x) by the contribution degree Ct(x) to calculate a result thereof as Qt(x), as shown in the following Expression (1).

[Math. 1]

$$Q_{t,c}(x) = C_t(x) P_{t,c}(x) \quad (1)$$

The speaker feature calculation unit 12 calculates, using the sound posterior probability Qt(x) weighted by the contribution degree and the sound feature At(x), a zeroth-order statistic S0(x) of the speech signal x based on the following Expression (2) and a first-order statistic S1(x) thereof based on the following Expression (3).

[Math. 2]

$$S_0(x) = \begin{pmatrix} S_{0,1} I_D & \cdots & 0_D \\ \vdots & \ddots & \vdots \\ 0_D & \cdots & S_{0,C} I_D \end{pmatrix}, S_{0,c} = \sum_{t=1}^{T} Q_{t,c}(x) \quad (2)$$

[Math. 3]

$$S_1(x) = (S_{1,1}, S_{1,2}, \ldots, S_{1,c})^T, S_{1,c} = \sum_{t=1}^{T} Q_{t,c}(x)(A_t(x) - m_c) \quad (3)$$

Subsequently, the speaker feature calculation unit 12 calculates F(x), which is the i-vector of the speech signal x, based on the following Expression (4).

[Math. 4]

$$F(x)=(I+T^T\Sigma^{-1}S_0(x)T)^{-1}T^T\Sigma^{-1}S_1(x) \quad (4)$$

In the Expressions (1) to (4), C represents the number of elements in the statistics S0(x) and S1(x), D represents the number of elements (the number of dimensions) in the sound feature At(x), mc represents a mean vector of the sound feature in a c-th area in a sound feature space, I represents a unit matrix, and 0 represents a zero matrix. T is a parameter for calculation of the i-vector, and Σ is a covariance matrix of the sound feature in the sound feature space.

If the contribution degree Ct(x) is equal to one at every time instant t (t={1 . . . T}, T represents a natural number which is not less than 1) of the speech signal x when the speaker feature calculation unit 12 calculates the feature vector F(x) with the above-mentioned procedure, this procedure is equivalent to an i-vector calculation procedure described in Non-Patent Literature 1. In this example embodiment, the speaker feature calculation unit 12 can calculate the feature vector F(x) different from the i-vector described in Non-Patent Literature 1 by using the contribution degree Ct(x) estimated by the contribution degree estimation unit 11 in accordance with the time instant t of the speech signal x.

Thus, in the speech processing device 200, it is possible to produce the feature vector in accordance with the quality of the speech signal because the speaker feature calculation unit 12 calculates the feature vector F(x) for the speech signal x using the contribution degree Ct(x) in accordance with the quality of the respective segments of the speech signal.

The contribution degree learning unit 24 learns, using training speech signals, the contribution degree estimator which can be stored in the contribution degree storage unit 23. In a case where the contribution degree estimator is, for example, the neural network, the contribution degree learning unit 24 optimizes, in accordance with a general optimization criterion, parameters such as connection weighting factors between nodes constituting the neural network. The training speech signals used by the contribution degree learning unit 24 comprise a collection of a plurality of speech signals, and each speech signal is made to correspond to any of the kinds of the quality of the signals produced by the contribution degree estimation unit 11.

Now, description will proceed to an example of the method according to which the contribution degree learning unit 24 learns the contribution degree estimator whose input is the sound feature and whose output is the two kinds of the quality of signals, namely, a "speech leading to a correct solution in the speaker recognition" and a "speech causing an error in the speaker recognition".

(a) First, the contribution degree learning unit 24 learns, using a plurality of speech signals with speaker labels, a discriminator which can discriminate the speaker labels of the speech signals. (b) Subsequently, the contribution degree learning unit 24 converts each of the plurality of speech signals with the speaker labels into a time series of sound features calculated every short-time frame and discriminates a speaker label of each frame using the discriminator learned in (a). (c) Next, the contribution degree learning unit 24 defines that, among the discriminated speaker labels of the respective frames, a frame where a preliminarily given speaker label and the speaker label discriminated by the discriminator are identical with each other is the "speech leading to a correct solution in the speaker recognition" and other frames are the "speech causing an error in the speaker recognition". (d) Then, the contribution degree learning unit 24 learns the contribution degree estimator using, as the training speech signals, the "speech leading to a correct solution in the speaker recognition" and the "speech causing an error in the speaker recognition".

As described above, in the speech processing device 200 according to the example embodiment, the contribution degree estimation unit 11 can calculate the contribution degree of the speech signal as an indicator representing the quality in accordance with the segment of the speech signal. In addition, the speaker feature calculation unit 12 calculates the feature vector on the basis of the sound statistic of the speech signal and the contribution degree. Accordingly, it is possible to produce, for the speech signal, the feature vector to reflect the quality of the respective segments of the speech signal. That is, the speech processing device 200 according to this example embodiment can calculate the speaker feature which is suitable to improve the accuracy of the speaker recognition.

Although a nonvolatile recording medium is suitable for the contribution degree storage unit 23 in the speech processing device 200 according to this example embodiment, it may be implemented by a volatile recording medium. A process for storing the contribution degree estimator in the contribution degree storage unit 23 is not especially limited. For instance, the contribution degree estimator may be stored in the contribution degree storage unit 23 via a recording medium or the contribution degree estimator transmitted through a communication line or the like may be stored in the contribution degree storage unit 23. Alternatively, the contribution degree estimator supplied via an input device may be stored in the contribution degree storage unit 23.

Operation of the Second Example Embodiment

Figure 4:
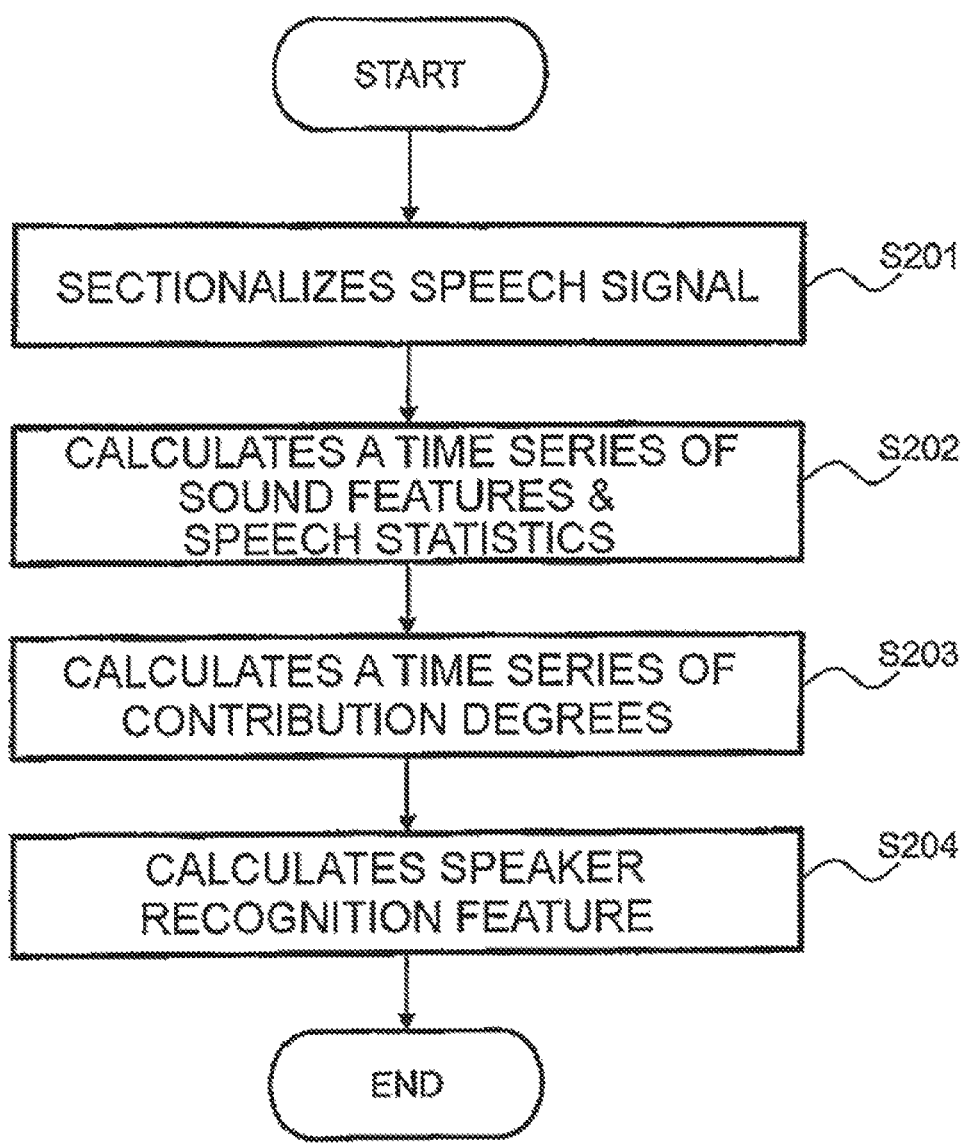
FIG. 4 is a flow chart for illustrating a flow of an operation of the speech processing device according to the second example embodiment of the present invention.

Now, an operation of the speech processing device 200 in the second example embodiment will be described using a flow chart of FIG. 4. FIG. 4 is a flow chart for illustrating an example of the operation of the speech processing device 200.

The speech processing device 200 receives one or more speech signals from the outside and supplies the speech signal to the speech segment detection unit 21. Specifically, the speech segment detection unit 21 segments the received speech signal and delivers the segmented speech signal to the contribution degree estimation unit 11 and the speech statistic calculation unit 22 (step S201).

The speech statistic calculation unit 22 carries out short-time frame analysis processing on each of the received one or more segmented speech signals to calculate a time series of the sound features and the speech statistics (step S202).

The contribution degree estimation unit 11 carries out short-time frame analysis processing on each of the received one or more segmented speech signals to calculate a time series of the contribution degrees (step S203).

The speaker feature calculation unit 12 calculates and produces the speaker recognition feature on the basis of the received one or more time series of the sound features, the speech statistics, and the contribution degrees (step S204). The speech processing device 200 terminates a series of processing when reception of the speech signals from the outside is finished.

Advantageous Effects of the Second Example Embodiment

As described above, with the speech processing device 200 according to this example embodiment, it is possible to improve an accuracy of speaker recognition using the speaker feature calculated by the speech processing device 200. This is because, in the speech processing device 200, the contribution degree estimation unit 11 calculates the quality of the speech signal as the contribution degree and the speaker feature calculation unit 12 calculates the feature vector to reflect the contribution degree, thereby producing the feature vector with weight put on the segment during which the speech signal has a high quality.

Thus, the speech processing device 200 according to this example embodiment calculates, for the speech signal, the feature vector to reflect the contribution degree in accordance with the quality of the respective segments. As a result, it is possible to calculate the feature suitable for the speaker recognition even if unclear utterance of the speaker, any sound different from a speaking voice, such as coughing and laughing of the speaker, noises, and so on are mixed in the segment of the speech signal.

Third Example Embodiment

Figure 5:
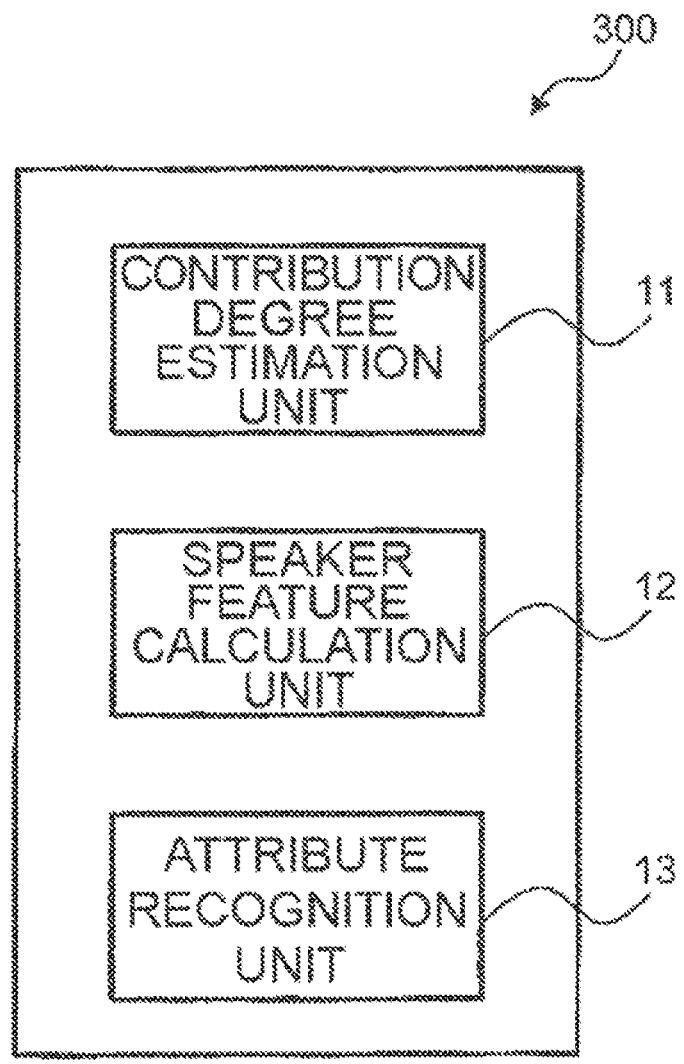
FIG. 5 is a block diagram for illustrating a configuration of a speech processing device according to a third example embodiment of the present invention.

FIG. 5 is a block diagram for illustrating an example of a configuration of a speech processing device according to a third example embodiment of this invention.

As illustrated in FIG. 5, the speech processing device 300 includes the contribution degree estimation unit 11, the speaker feature calculation unit 12, and an attribute recognition unit 13. The speech processing device 300 is a speech processing device which can recognize attribute information.

The contribution degree estimation unit 11 and the speaker feature calculation unit 12 are similar to those of the first and the second example embodiments and, therefore, description thereof will be omitted.

The attribute recognition unit 13 receives, from the speaker feature calculation unit 12, the feature for recognizing the attribute information. The attribute recognition unit 13 recognizes, on the basis of the feature, a speaker of the speech signal, a language spoken in the speech signal, an emotion included in the speech signal, a type of personality of the speaker of the speech signal, and so on. Specifically, the attribute recognition unit 13 refers to a storage unit (not shown) storing, for example, comparison speech data for comparing the feature. In this event, the attribute recognition unit 13 can recognize the attribute information by calculating a degree of similarity between the feature and the comparison speech data or the like.

Specific Example of the Third Example Embodiment

New, the description will proceed to a specific example of application of the speech processing device 300 according to the third example embodiment of this invention.

The speaker feature calculated by the speech processing device 300 according to the third example embodiment of this invention is applicable to the speaker recognition for estimating the speaker of the speech signal. For example, the speech processing device calculates, on the basis of a first speaker feature calculated from a first speech signal and a second speaker feature calculated from a second speech signal, a cosine similarity as an indicator indicative of similarity between the two speaker features. For example, in a case where speaker verification is intended, the speech processing device may produce decision information of success or failure of verification based on the above-mentioned similarity. In addition, in a case where the speaker identification is intended, the speech processing device may prepare a plurality of second speech signals for the first speech signal, calculate respective similarities, and produce a set having a larger value.

The speech processing device 300 according to the third example embodiment of this invention is an example of a feature calculation device for calculating a feature for recognizing attribute information from the speech signal. When an attribute is a speaker of the speech signal, the speech processing device 300 is applicable as a speaker feature extraction device. In addition, for example, for the speech signal of sentence utterance, the speech processing device 300 is applicable as a part of a speech recognition device including a mechanism for adaptation to speech trait of the speaker on the basis of speaker information estimated using the speaker feature. In addition, it is noted here that the information representing the speaker may be information representing sex of the speaker or information representing an age or an age group of the speaker.

The speech processing device 300 according to the third example embodiment of this invention is applicable as a language feature calculation device when the attribute is information indicative of a language transmitted by the speech signal (a language constituting the speech signal). In addition, for example, for the speech signal of sentence utterance, the speech processing device 300 is applicable as a part of a speech translation device including a mechanism for selecting, on the basis of language information estimated using the language feature in question, a language to be translated.

The speech processing device 300 according to the third example embodiment of this invention is applicable as an emotion feature calculation device when the attribute is information representing emotion on utterance of the speaker. In addition, for example, for a large number of speech signals of utterance which are accumulated, the speech processing device 300 is applicable as a part of a speech retrieval device or a speech display device which includes a mechanism for identifying, on the basis of emotion information estimated using the emotion feature, the speech signal corresponding to specified emotion. The emotion information includes, for example, information representing emotion, information representing a type of personality of the speaker, or the like.

As described above, the attribute information of the speech signal in this example embodiment is information indicating at least any one selected from the group consisting of the speaker of the speech signal, the language spoken in the speech signal,—the emotion included in the speech signal, and the type of personality of the speaker of the speech signal.

(Explanation as regards Hardware Configuration)

While this invention has been particularly shown and described with reference to the example embodiments thereof, this invention is not limited to the example embodiments mentioned above. It will be understood by those of ordinary skill in the art that various changes in form and details may be made therein without departing from the spirit and scope of the present invention as defined by the claims. In other words, it will be understood that this invention is not limited to the above-mentioned example embodiments and may be modified in various manners which are also included within the scope of this invention.

As described above, the speech processing device or the like in one mode of the present invention has an effect that the accuracy of speaker recognition can be improved by extracting the feature vector to reflect the quality of the speech signal and is useful as the speech processing device or the like and the speaker recognition device. In a case of obtaining and using information relating to users in this invention, these actions shall be carried out lawfully.

Other Example Embodiments

The speech processing device may be implemented by hardware or may be implemented by software. Also, the speech processing device may be implemented by a combination of hardware and software.

Figure 6:
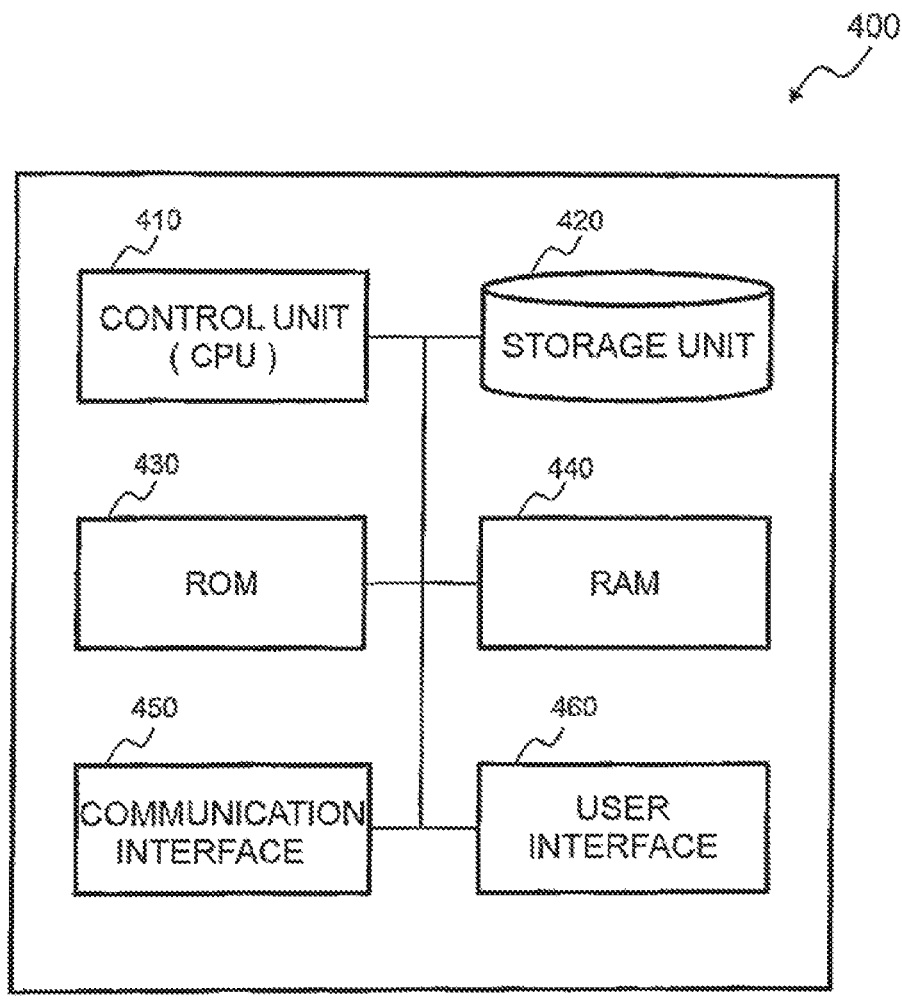
FIG. 6 is a block diagram for illustrating a configuration of a speech processing device according to another example embodiment of the present invention.

FIG. 6 is a block diagram for illustrating one example of an information processing apparatus (computer) constituting the speech processing device.

As shown in FIG. 6, the information processing apparatus 400 comprises a control unit (CPU: Central Processing Unit) 410, a storage unit 420, an ROM (Read Only Memory) 430, an RAM (Random Access Memory) 440, a communication interface 450, and a user interface 460.

The control unit (CPU) 410 may implement various functions of the speech processing device and the speaker recognition device by developing a program, which is stored in the storage unit 420 or the ROM 430, into the RAM 440 and by executing the program. Also, the control unit (CPU) 410 may include an internal buffer which is adapted to temporarily store data or the like.

The storage unit 420 comprises a bulk storage medium which can hold various types of data and may be implemented by a storage medium such as an HDD (Hard Disk Drive), and an SSD (Solid State Drive). The storage unit 420 may be a cloud storage existing in a communication network when the information processing apparatus 400 is connected to the communication network via the communication interface 450. The storage unit 420 may hold the program readable by the control unit (CPU) 410.

The ROM 430 comprises a nonvolatile storage device which may comprise a flash memory having a small capacity as compared to the storage unit 420. The ROM 430 may hold a program which is readable by the control unit (CPU) 410. The program readable by the control unit (CPU) 410 may be held in at least one of the storage unit 420 and the ROM 430.

The program which is readable by the control unit (CPU) 410 may be supplied to the information processing apparatus 400 in a state where it is non-temporarily stored in various types of storage media readable by the computer. Such a storage medium is, for example, a magnetic tape, a magnetic disk, a magneto-optical disc, a CD-ROM, a CD-R, a CD-R/W, and a semiconductor memory.

The RAM 440 comprises a semiconductor memory such as a DRAM (Dynamic Random Access Memory) and an SRAM (Static Random Access Memory) and may be used as an internal buffer which temporarily stores data and so on.

The communication interface 450 is an interface which connects the information processing apparatus 400 and the communication network via wire or wirelessly.

The user interface 460 comprises, for example, a display unit such as a display or the like, and an input unit such as a keyboard, a mouse, a touch-panel or the like.

A part or a whole of the example embodiments described above may also be described as, but not limited to, the following supplementary notes.

(Supplementary Note 1)
A speech processing device, comprising:
a contribution degree estimation unit configured to calculate a contribution degree representing a quality of a segment of the speech signal; and
a speaker feature calculation unit configured to calculate a feature from the speech signal, for recognizing attribute information of the speech signal, using the contribution degree as a weight of the segment of the speech signal.

(Supplementary Note 2)
The speech processing device according to Supplementary Note 1, further comprising a speech statistic calculation unit configured to calculate a speech statistic representing a degree of appearance of each of types of sounds included in the speech signal,
wherein the speaker feature calculation unit is configured to calculate the feature on the basis of the speech statistic of the speech signal and the contribution degree of the speech signal.

(Supplementary Note 3)
The speech processing device according to Supplementary Note 1 or 2,
wherein the contribution degree estimation unit is configured to calculate, as the contribution degree of the speech signal, at least any one selected from the group consisting of:
a probability representing the degree that the segment of the speech signal is the speech, calculated by a classifier which distinguishes speech signal from non-speech signal;
a probability representing the degree that the segment of the speech signal leads to a correct determination in the speaker recognition, calculated by a classifier which distinguishes correctly recognized speech signal from the other speech signal; and
a probability representing the degree that the segment of the speech signal causes an error in the speaker recognition, calculated by a classifier which distinguishes misrecognized speech signal from the other speech signal.

(Supplementary Note 4)
The speech processing device according to Supplementary Note 3,
wherein the contribution degree estimation unit is configured to calculate the contribution degree of the speech signal by using a neural network.

(Supplementary Note 5)
The speech processing device according to Supplementary Note 3 or 4,
wherein the speaker feature calculation unit is configured to calculate an i-vector as the feature.

(Supplementary Note 6)
The speech processing device according to any one of Supplementary Notes 1 to 5, comprising an attribute recognition unit configured to recognize the attribute information on the basis of the feature.

(Supplementary Note 7)
The speech processing device according to any one of Supplementary Notes 1 to 6,
wherein the attribute information of the speech signal comprises information indicative of at least any one selected from the group consisting of a speaker of the speech signal; a language spoken in the speech signal; an emotion included in the speech signal; and a type of personality of the speaker of the speech signal.

(Supplementary Note 8)

A speech processing method comprising:

calculating a contribution degree representing a quality of a segment of the speech signal; and calculating a feature from the speech signal, for recognizing attribute information of the speech signal, using the contribution degree as a weight of the segment of the speech signal.

(Supplementary Note 9)

The speech processing method according to Supplementary Note 8, further comprising:

calculating a speech statistic representing a degree of appearance of each of types of sounds included in the speech signal; and calculating the feature on the basis of the speech statistic of the speech signal and the contribution degree of the speech signal.

(Supplementary Note 10)

The speech processing method according to Supplementary Note 8 or 9, wherein, as the contribution degree of the speech signal, calculated is at least any one selected from the group consisting of:

a probability representing the degree that the segment of the speech signal is the speech, calculated by a classifier which distinguishes speech signal from non-speech signal;

a probability representing the degree that the segment of the speech signal leads to a correct determination in the speaker recognition, calculated by a classifier which distinguishes correctly recognized speech signal from the other speech signal; and a probability representing the degree that the segment of the speech signal causes an error in the speaker recognition, calculated by a classifier which distinguishes misrecognized speech signal from the other speech signal.

(Supplementary Note 11) The speech processing method according to Supplementary Note 10, wherein the contribution degree is calculated by using a neural network.

(Supplementary Note 12) The speech processing method according to Supplementary Note 10 or 11, wherein an i-vector is calculated as the feature.

(Supplementary Note 13) The speech processing method according to any one of Supplementary Notes 8 to 12, wherein the attribute information is recognized on the basis of the feature.

(Supplementary Note 14)

The speech processing method according to any one of Supplementary Notes 8 to 13, wherein the attribute information of the speech signal comprises information indicative of at least any one selected from the group consisting of a speaker of the speech signal; a language spoken in the speech signal; an emotion included in the speech signal; and a type of personality of the speaker of the speech signal.

(Supplementary Note 15)

A speech processing program for causing a computer to execute:

a process for calculating a contribution degree representing a quality of a segment of the speech signal; and a process for calculating a feature from the speech signal, for recognizing attribute information of the speechsignal, using the contribution degree as a weight of the segment of the speech signal.

(Supplementary Note 16)

The speech processing program according to Supplementary Note 15, causing the computer to further execute:

a process for calculating a speech statistic representing a degree of appearance of each of types of sounds included in the speech signal, and a processing for calculating the feature on the basis of the speech statistic of the speech signal and the contribution degree of the speech signal.

(Supplementary Note 17)

The speech processing program according to Supplementary Note 15 or 16, causing the computer to execute a process for calculating, as the contribution degree of the speech signal, at least any one selected from the group consisting of:

a probability representing the degree that the segment of the speech signal is the speech, calculated by a classifier which distinguishes speech signal from non-speech signal;

a probability representing the degree that the segment of the speech signal leads to a correct determination in the speaker recognition, calculated by a classifier which distinguishes correctly recognized speech signal from the other speech signal; and a probability representing the degree that the segment of the speech signal causes an error in the speaker recognition, calculated by a classifier which distinguishes misrecognized speech signal from the other speech signal.

(Supplementary Note 18)

The speech processing program according to Supplementary Note 17, causing the computer to executes a process for calculating the contribution degree of the speech signal by using a neural network.

(Supplementary Note 19)

The speech processing program according to Supplementary Note 17 or 18, causing the computer to execute a process for calculating an i-vector as the feature.

(Supplementary Note 20)

The speech processing program according to any one of Supplementary Notes 15 or 19, causing the computer to execute a process for recognizing the attribute information on the basis of the feature.

(Supplementary Note 21)

The speech processing program according to any one of Supplementary Notes 15 to 20, wherein the attribute information of the speech signal comprises information indicative of at least any one selected from the group consisting of a speaker of the speech signal; a language spoken in the speech signal; an emotion included in the speech signal; and a type of personality of the speaker of the speech signal.

REFERENCE SIGNS LIST 11 contribution degree estimation unit
12 speaker feature calculation unit
13 attribute recognition unit
21 speech segment detection unit
22 speech statistic calculation unit
23 contribution degree storage unit
24 contribution degree learning unit
100, 200, 300 speech processing device
400 information processing apparatus
410 control unit (CPU)
420 storage unit
430 ROM 440 RAM
450 communication interface
460 user interface

The invention claimed is:

1. A speech processing device, comprising:
a processor; and
memory storing executable instructions that, when executed by the processor, causes the processor to perform as:
a contribution degree estimation unit configured to calculate a contribution degree representing a quality of a segment of a speech signal indicative of speech, the speech signal being divided into a plurality of segments; and
a speaker feature calculation unit configured to calculate a speaker feature from the speech signal, for recognizing attribute information of the speech signal, using the contribution degree as a weight of each segment of the speech signal, the speaker feature being indicative of individuality for identifying a speaker which utters the speech.

2. The speech processing device as claimed in claim 1, wherein the processor is configured to divide the speech signal into silence segments and speech segments and to classify the quality in the speech segments into a speech sound leading to a correct solution in speaker recognition and a speech sound causing an error in the speaker recognition.

3. The speech processing device as claimed in claim 1, wherein the processor further performs as a speech statistic calculation unit configured to calculate a speech statistic representing a degree of appearance of each of types of sounds included in the speech signal, and
wherein the speaker feature calculation unit is configured to calculate the speaker feature on the basis of the speech statistic of the speech signal and the contribution degree of the speech signal.

4. The speech processing device as claimed in claim 1, wherein the contribution degree estimation unit is configured to calculate, as the contribution degree of the speech signal, at least any one selected from the group consisting of:
a probability representing the degree that the segment of the speech signal is the speech, calculated by a classifier which distinguishes speech signal from non-speech signal;
a probability representing the degree that the segment of the speech signal leads to a correct determination in the speaker recognition, calculated by a classifier which distinguishes correctly recognized speech signal from an other speech signal; and
a probability representing the degree that the segment of the speech signal causes an error in the speaker recognition, calculated by a classifier which distinguishes misrecognized speech signal from the other speech signal.

5. The speech processing device as claimed in claim 4, wherein the contribution degree estimation unit is configured to calculate the contribution degree of the speech signal by using a neural network.

6. The speech processing device as claimed in claim 1, wherein the speaker feature calculation unit is configured to calculate an i-vector as the speaker feature.

7. The speech processing device as claimed in claim 1, wherein the processor further performs as an attribute recognition unit configured to recognize the attribute information on the basis of the speaker feature.

8. The speech processing device as claimed in claim 1, wherein the attribute information of the speech signal comprises information indicative of at least any one selected from the group consisting of the speaker of the speech signal; a language spoken in the speech signal; an emotion included in the speech signal; and a type of personality of the speaker of the speech signal.

9. A speech processing method comprising:
calculating, by a processor, a contribution degree representing a quality of a segment of a speech signal indicative of speech, the speech signal being divided into a plurality of segments; and
calculating, by the processor, a speaker feature from the speech signal, for recognizing attribute information of the speech signal, using the contribution degree as a weight of each segment of the speech signal, the speaker feature being indicative of individuality for identifying a speaker which utters the speech.

10. The speech processing method as claimed in claim 9, further comprising:
dividing, by the processor, the speech signal into silence segments and speech segments; and
classifying, by the processor, the quality in the speech segments into a speech sound leading to a correct solution in speaker recognition and a speech sound causing an error in the speaker recognition.

11. The speech processing method as claimed in claim 9, further comprising:
calculating, by the processor, a speech statistic representing a degree of appearance of each of types of sounds included in the speech signal; and
calculating, by the processor, the feature on the basis of the speech statistic of the speech signal and the contribution degree of the speech signal.

12. A non-transitory computer readable recording medium for storing a speech processing program for causing a computer to execute:
a process for calculating a contribution degree representing a quality of a segment of a speech signal indicative of speech, the speech signal being divided into a plurality of segments; and
a process for calculating a speaker feature from the speech signal, for recognizing attribute information of the speech signal, using the contribution degree as a weight of each segment of the speech signal, the speaker feature being indicative of individuality for identifying a speaker which utters the speech.

13. The non-transitory computer readable recording medium as claimed in claim 12,
wherein the speech processing program further causes the computer to execute:
a process for dividing the speech signal into silence segments and speech segments; and
a process for classifying the quality in the speech segments into a speech sound leading to a correct solution in speaker recognition and a speech sound causing an error in the speaker recognition.

* * * * *